(12) United States Patent
Barkan et al.

(10) Patent No.: US 12,475,341 B1
(45) Date of Patent: Nov. 18, 2025

(54) TRI-OPTIC SCANNER

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/895,072

(22) Filed: Sep. 24, 2024

(51) Int. Cl.
*G06K 7/10* (2006.01)

(52) U.S. Cl.
CPC ................. *G06K 7/10712* (2013.01)

(58) Field of Classification Search
CPC .. G06K 7/1404; G06K 7/1408; G06K 7/1413; G06K 7/1417; G06K 7/10861; G06K 7/10712; G06K 7/1096
See application file for complete search history.

(56) References Cited

U.S. PATENT DOCUMENTS

| 2011/0168780 A1* | 7/2011 | McQueen | G06K 7/1096 235/470 |
| 2018/0314863 A1* | 11/2018 | Gao | G06K 7/1456 |

* cited by examiner

*Primary Examiner* — Laura A Gudorf
(74) *Attorney, Agent, or Firm* — Yuri Astvatsaturov

(57) ABSTRACT

A tri-optic scanner may be provided by an indicia reader, including a housing, including a lower housing portion having a first surface defining a first horizontal plane, a horizontal window, an upper housing portion bounded by a first frontal plane and a second horizontal plane, a first distal window, a second distal window, a first imaging assembly having a first imaging sensor, configured to capture first image-data from a first field of view ($FOV_1$), a second imaging assembly having a second imaging sensor, configured to capture second image-data from a second field of view ($FOV_2$), a scanning region, and a visual data analysis module configured to analyze at least one of the first image-data and the second image-data to decode data corresponding to an indicium appearing in at least one of the first image-data and the second image-data.

24 Claims, 9 Drawing Sheets

TRI-OPTIC SCANNER

BACKGROUND

Multiplanar, or otherwise known as bi-optic, indicia readers are commonly used in retail environments for helping process checkout transactions. Many such readers have scanning "dead zones" where an indicium (such as a barcode) may be passed through a scanning region of the reader (as perceived by a user), and the data from the indicia is not read by the scanner, which may be attributed to an orientation of the scanning component(s) relative to other components of the device.

SUMMARY

The present disclosure provides tri-optic indicia readers, according to one or more embodiments.

In an embodiment, the technology of the present disclosure is provided by an indicia reader, including a housing, a lower housing portion of the housing having a first surface defining a first horizontal plane, a horizontal window disposed in the first surface, an upper housing portion extending above the first horizontal plane, the upper housing portion bounded by a first frontal plane and a second horizontal plane, the first frontal plane being perpendicular to the first horizontal plane and defined by a forward extent of the upper housing portion, the second horizontal plane being parallel to the first horizontal plane and defined by an upward extent of the upper housing portion, a first distal window disposed in a first distal corner of the upper housing portion, a second distal window disposed in a second distal corner of the upper housing portion, opposite the first distal corner, a first imaging assembly having a first imaging sensor, the first imaging assembly configured to capture first image-data from a first field of view ($FOV_1$) extending through the first distal window, the $FOV_1$ having an $FOV_1$ central axis, an $FOV_1$ working range defined along the $FOV_1$ central axis, an $FOV_1$ upper boundary, an $FOV_1$ lower boundary, an $FOV_1$ first lateral boundary, and an $FOV_1$ second lateral boundary, the $FOV_1$ lower boundary being closer to the first horizontal plane than the $FOV_1$ upper boundary, a second imaging assembly having a second imaging sensor, the second imaging assembly configured to capture second image-data from a second field of view ($FOV_2$) extending through the second distal window, the $FOV_2$ having an $FOV_2$ central axis, an $FOV_2$ working range defined along the $FOV_2$ central axis, an $FOV_2$ upper boundary, an $FOV_2$ lower boundary, an $FOV_2$ first lateral boundary, and an $FOV_2$ second lateral boundary, the $FOV_2$ lower boundary being closer to the first horizontal plane than the $FOV_2$ upper boundary, a scanning region, defined by a union of at least the $FOV_1$ and the $FOV_2$. The second horizontal plane intersects the first frontal plane at a first height relative to the first surface, the $FOV_1$ upper boundary intersects the first frontal plane at second height relative to the first surface, the $FOV_2$ upper boundary intersects the first frontal plane at third height relative to the first surface, and at least one of the second height is greater than the first height, and the third height is greater than the first height. The indicia reader includes a visual data analysis module configured to analyze at least one of the first image-data and the second image-data to decode data corresponding to an indicium appearing in at least one of the first image-data and the second image-data.

In a variation of this embodiment, the first imaging sensor is disposed beneath the first horizontal plane, and the $FOV_1$ is folded via a first folding mirror disposed proximately to the first distal window.

In a variation of this embodiment, the second imaging sensor is disposed beneath the first horizontal plane, and the $FOV_2$ is folded via a second folding mirror disposed proximately to the second distal window.

In a variation of this embodiment, the first distal window is spaced away from a second frontal plane defined by a distal extent of the upper housing portion, by a distance not more than 2 inches.

In a variation of this embodiment, the second distal window is spaced away from a second frontal plane defined by a distal extent of the upper housing portion, by a distance not more than 2 inches.

In a variation of this embodiment, the first distal window is oriented obliquely with respect to the first frontal plane.

In a variation of this embodiment, the second distal window is oriented obliquely with respect to the first frontal plane.

In a variation of this embodiment, the upper housing portion includes an inclined surface aligned with at least one of the $FOV_1$ lower boundary, and the $FOV_2$ lower boundary.

In a variation of this embodiment, the inclined surface has a length which measures at least 50% of a distance between the frontal plane and a distal extremity of the upper housing portion.

In a variation of this embodiment, the inclined surface includes a recess including at least one selected from a group consisting of an inclined window, a fourth imaging sensor, a camera, an LED, and combinations thereof.

In a variation of this embodiment, at least one of a perpendicular distance between the first frontal plane and a point on the $FOV_1$ central axis at which the $FOV_1$ working range terminates is greater than 7 inches, or a perpendicular distance between the first frontal plane and a point on the $FOV_2$ central axis at which the $FOV_2$ working range terminates is greater than 7 inches.

In a variation of this embodiment, the indicia reader further includes a third imaging assembly having a third imaging sensor, the third imaging assembly configured to capture third image-data from a third field of view ($FOV_3$) and fourth field of view ($FOV_4$), both the $FOV_3$ and the $FOV_4$ extending though the horizontal window, and the $FOV_3$ and the $FOV_4$ contain a surface area of the horizontal window greater than 90% of a total surface area of the horizontal window.

In a variation of this embodiment, the first imaging assembly and the second imaging assembly are configured such that an intersection between the $FOV_1$ first lateral boundary and the $FOV_2$ second lateral boundary is disposed on a side of the first frontal plane including the upper housing portion.

In a variation of this embodiment, a length of the horizontal window is greater than 6.5 inches, the length measured in a direction perpendicular to the first frontal plane.

In a variation of this embodiment, the $FOV_3$ and the $FOV_4$ contain a surface area of the horizontal window greater than 90% of the total surface area of the horizontal window.

In a variation of this embodiment, the horizontal window defines an orthogonal bisector, and the orthogonal bisector is independently contained by each of the $FOV_1$, and the $FOV_2$.

In another embodiment, the technology of the present disclosure is provided by an indicia reader, including a housing, a lower housing portion of the housing having a first surface defining a first horizontal plane, a horizontal window disposed in the first surface, an upper housing portion extending beyond the first horizontal plane, the upper housing portion bounded by a first frontal plane and a second horizontal plane, the first frontal plane being perpendicular to the first horizontal plane and defined by a forward extent of the upper housing portion, the second horizontal plane being parallel to the first horizontal plane and defined by an upward extent of the upper housing portion, a first distal window disposed in a first distal corner of the upper housing portion, oriented obliquely to the first frontal plane, a second distal window disposed in a second distal corner of the upper housing portion, opposite the first distal corner, oriented obliquely to the first frontal plane, a first imaging assembly having a first imaging sensor, the first imaging assembly configured to capture first image-data from a first field of view ($FOV_1$) extending through the first distal window, the $FOV_1$ having an $FOV_1$ central axis, an $FOV_1$ working range defined along the $FOV_1$ central axis, an $FOV_1$ upper boundary, an $FOV_1$ lower boundary, an $FOV_1$ first lateral boundary, and an $FOV_1$ second lateral boundary, the $FOV_1$ lower boundary oriented closer to the horizontal window than the $FOV_1$ upper boundary, a second imaging assembly having a second imaging sensor, the second imaging assembly configured to capture second image-data from a second field of view ($FOV_2$) extending through the second distal window, the $FOV_2$ having an $FOV_2$ central axis, an $FOV_2$ working range defined along the $FOV_2$ central axis, an $FOV_2$ upper boundary, an $FOV_2$ lower boundary, an $FOV_2$ first lateral boundary, and an $FOV_2$ second lateral boundary, the $FOV_2$ lower boundary oriented closer to the horizontal window than the $FOV_2$ upper boundary, a third imaging assembly having a third imaging sensor, the third imaging assembly configured to capture third image-data from a third field of view ($FOV_3$) and fourth field of view ($FOV_4$), both the $FOV_3$ and the $FOV_4$ extending though the horizontal window, the $FOV_3$ having an $FOV_3$ central axis, an $FOV_3$ proximal boundary, an $FOV_3$ distal boundary, and $FOV_3$ working range defined along the $FOV_3$ central axis, an $FOV_3$ first lateral boundary, and an $FOV_3$ second lateral boundary, and the $FOV_4$ having an $FOV_4$ central axis, an $FOV_4$ proximal boundary, an $FOV_4$ distal boundary, and an $FOV_4$ working range defined along the $FOV_4$ central axis, an $FOV_4$ first lateral boundary, and an $FOV_4$ second lateral boundary, a scanning region defined by a union of the $FOV_1$, the $FOV_2$, the $FOV_3$, and the $FOV_4$. The $FOV_3$ distal boundary and the $FOV_4$ distal boundary respectively intersect the first frontal plane between the first horizontal plane and the second horizontal plane such that the third image-data is receivable by the third imaging sensor from an indicium appearing in at least one of a first volume bounded by the $FOV_3$ first lateral boundary, the $FOV_3$ second lateral boundary, the $FOV_3$ distal boundary and the first frontal plane, or a second volume bounded by the $FOV_4$ first lateral boundary, the $FOV_4$ second lateral boundary, the $FOV_4$ distal boundary and the first frontal plane, and a visual data analysis module configured to analyze at least one of the first image-data to decode data corresponding to an indicium appearing in the first image-data, the second image-data to decode data corresponding to an indicium appearing in the second image-data, or the third image-data to decode data corresponding to an indicium appearing in the third image-data.

In a variation of this embodiment, the upper housing portion includes an inclined surface which is substantially aligned with the $FOV_3$ distal boundary and the $FOV_4$ distal boundary such that the upper housing portion restricts access to a region defined behind the $FOV_3$ distal boundary and the $FOV_4$ distal boundary and above the first horizontal plane.

In a variation of this embodiment, the inclined surface includes a recess including at least one selected from a group consisting of an inclined window, a fourth imaging sensor, a camera, an LED, and combinations thereof.

In a variation of this embodiment, the horizontal window defines an orthogonal bisector, and the orthogonal bisector is independently contained by each of the $FOV_1$, the $FOV_2$, and the $FOV_3$.

In a variation of this embodiment, the $FOV_3$ proximal boundary and the $FOV_4$ proximal boundary respectively intersect a third frontal plane defined upwards from a proximal edge of the horizontal window such that the third image-data is receivable by the third imaging sensor from an indicium appearing in at least one of a first volume bounded by the $FOV_3$ first lateral boundary, the $FOV_3$ second lateral boundary, the $FOV_3$ proximal boundary, and the third frontal plane, or a second volume bounded by the $FOV_4$ first lateral boundary, the $FOV_4$ second lateral boundary, the $FOV_4$ proximal boundary and the third frontal plane.

In a variation of this embodiment, the first imaging sensor is disposed in the lower housing portion, and the $FOV_1$ is folded towards the first imaging sensor via a first folding mirror disposed proximately to the first distal window.

In a variation of this embodiment, the second imaging sensor is disposed in the lower housing portion, and the $FOV_2$ is folded towards the second imaging sensor via a second folding mirror disposed proximately to the second distal window.

In a variation of this embodiment, the third imaging sensor is disposed in the lower housing portion, and the $FOV_3$ and the $FOV_4$ are folded and unified towards the third imaging sensor via a plurality of third mirrors.

In a variation of this embodiment, a perpendicular distance between the first frontal plane and a point on the $FOV_1$ central axis at a maximum extent of the $FOV_1$ working range is greater than 7 inches.

In a variation of this embodiment, a perpendicular distance between the first frontal plane and a point on the $FOV_2$ central axis at a maximum extent of the $FOV_2$ working range is greater than 7 inches.

In yet another embodiment, the technology of the present disclosure is provided y an indicia reader, including a housing, a lower housing portion of the housing having a first surface defining a first horizontal plane, a horizontal window disposed in the first surface, an upper housing portion extending beyond the first horizontal plane opposite to the lower housing portion, the upper housing portion bounded by a first frontal plane and a second horizontal plane, the first frontal plane being perpendicular to the first horizontal plane and defined by a forward extent of the upper housing portion, the second horizontal plane being parallel to the first horizontal plane and defined by an upward extent of the upper housing portion, a first distal window disposed in a first distal corner of the upper housing portion, oriented obliquely to the first frontal plane, a second distal window disposed in a second distal corner of the upper housing portion, opposite the first distal corner, oriented obliquely to the first frontal plane, a first imaging assembly having a first imaging sensor, the first imaging assembly configured to capture first image-data from a first field of view ($FOV_1$) extending through the first distal window, the $FOV_1$ having an $FOV_1$ central axis, an $FOV_1$ working range defined along the $FOV_1$ central axis, an $FOV_1$ upper boundary, an $FOV_1$ lower boundary, an $FOV_1$ first lateral boundary, and an $FOV_1$ second lateral boundary, the $FOV_1$ lower boundary being closer to the first horizontal plane than the $FOV_1$ upper boundary, a second imaging assembly having a second imaging sensor, the second imaging assembly configured to capture second image-data from a second field of view ($FOV_2$) extending through the second distal window, the $FOV_2$ having an $FOV_2$ central axis, an $FOV_2$ working range defined along the $FOV_2$ central axis, an $FOV_2$ upper boundary, an $FOV_2$ lower boundary, an $FOV_2$ first lateral boundary, and an $FOV_2$ second lateral boundary, the $FOV_2$ lower boundary being closer to the first horizontal plane than the $FOV_2$ upper boundary, wherein the second horizontal plane intersects the first frontal plane at a first height relative to the first surface, the $FOV_1$ upper boundary intersects the first frontal plane at second height relative to the first surface, the $FOV_2$ upper boundary intersects the first frontal plane at third height relative to the first surface, and at least one of the second height is greater than the first height, and the third height is greater than the first height, a third imaging assembly having a third imaging sensor, the third imaging assembly configured to capture third image-data from a third field of view ($FOV_3$) and fourth field of view ($FOV_4$), both the $FOV_3$ and the $FOV_4$ extending though the horizontal window, the $FOV_3$ having an $FOV_3$ central axis, an $FOV_3$ proximal boundary, an $FOV_3$ distal boundary, and $FOV_3$ working range defined along the $FOV_3$ central axis, an $FOV_3$ first lateral boundary, and an $FOV_3$ second lateral boundary, and the $FOV_4$ having an $FOV_4$ central axis, an $FOV_4$ proximal boundary, an $FOV_4$ distal boundary, and an $FOV_4$ working range defined along the $FOV_4$ central axis, an $FOV_4$ first lateral boundary, and an $FOV_4$ second lateral boundary, a scanning region defined by a union of the $FOV_1$, the $FOV_2$, the $FOV_3$, and the $FOV_4$. The $FOV_3$ distal boundary and the $FOV_4$ distal boundary respectively intersect the first frontal plane between the first horizontal plane and the second horizontal plane such that the third image-data is receivable by the third imaging sensor from an indicium appearing in at least one of a first volume bounded by the $FOV_3$ first lateral boundary, the $FOV_3$ second lateral boundary, the $FOV_3$ distal boundary and the first frontal plane, and a visual data analysis module configured to analyze at least one of the first image-data to decode data corresponding to an indicium appearing in the first image-data, the second image-data to decode data corresponding to an indicium appearing in the second image-data, or the third image-data to decode data corresponding to an indicium appearing in the third image-data.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

One or more of the drawings contained in the Figures of the present disclosure are illustrated with respect to an internally consistent dimensional system. Such drawings include a compass indicating directional axes, such an X axis, a Y axis and a Z axis. As used herein, the X axis, Y axis, and Z axis are mutually perpendicular to one another in three-dimensional space. While the devices of the present disclosure may be moved, translated and rotated into many different orientations, the drawings of the devices of the present disclosure have been illustrated to have a fixed orientation relative to the dimensional system to improve clarity and ease of understanding. Furthermore, this disclosure includes language corresponding to directions, dimensions and measurements within the dimensional system; such language is not intended to limit the subject matter of the present disclosure, but only to improve understanding.

DETAILED DESCRIPTION

Various bi-optic indicia readers (e.g., indicia readers with two imaging assemblies) are commonly used in retail environments, notably in self-checkout configurations, where the primary users of the indicia readers are largely untrained. Existing indicia readers often include scanning dead zones, where a user may perceive that an area proximate to the indicia reader is aligned with an imaging assembly of the reader, such that the user expects that an indicum passed through the area would be read by the indicia reader, when the indicium would not be read by the reader. The deviation between the perceptions of the user and the actual scanning region of the indicia reader may arise from the configuration of a housing (e.g., or other structural components) of the reader, as well as orientation and quantity of imaging assemblies. Furthermore, indicia readers may fail to read an indicum due to a user orienting the indicia in a manner incompatible with the imaging assemblies (e.g., at an angle), or moving the indicium at too great a speed relative to the indicia reader, resulting in unsuccessful scan attempts.

The tri-optic indicia readers of the present disclosure seek to improve to correlation between user perception of the scanning region and the actual scanning region of the indicia reader, and otherwise reduce unsuccessful scan attempts. The tri-optic indicia readers of the present disclosure include construction which increases the total volume of the scanning region and orients the fields-of-view of the imaging assemblies in a manner that reduces the scanning dead zones, increases the working range of the imaging assemblies, such that errors in the course of use by users (untrained or otherwise), may be substantially reduced.

Figure 1:
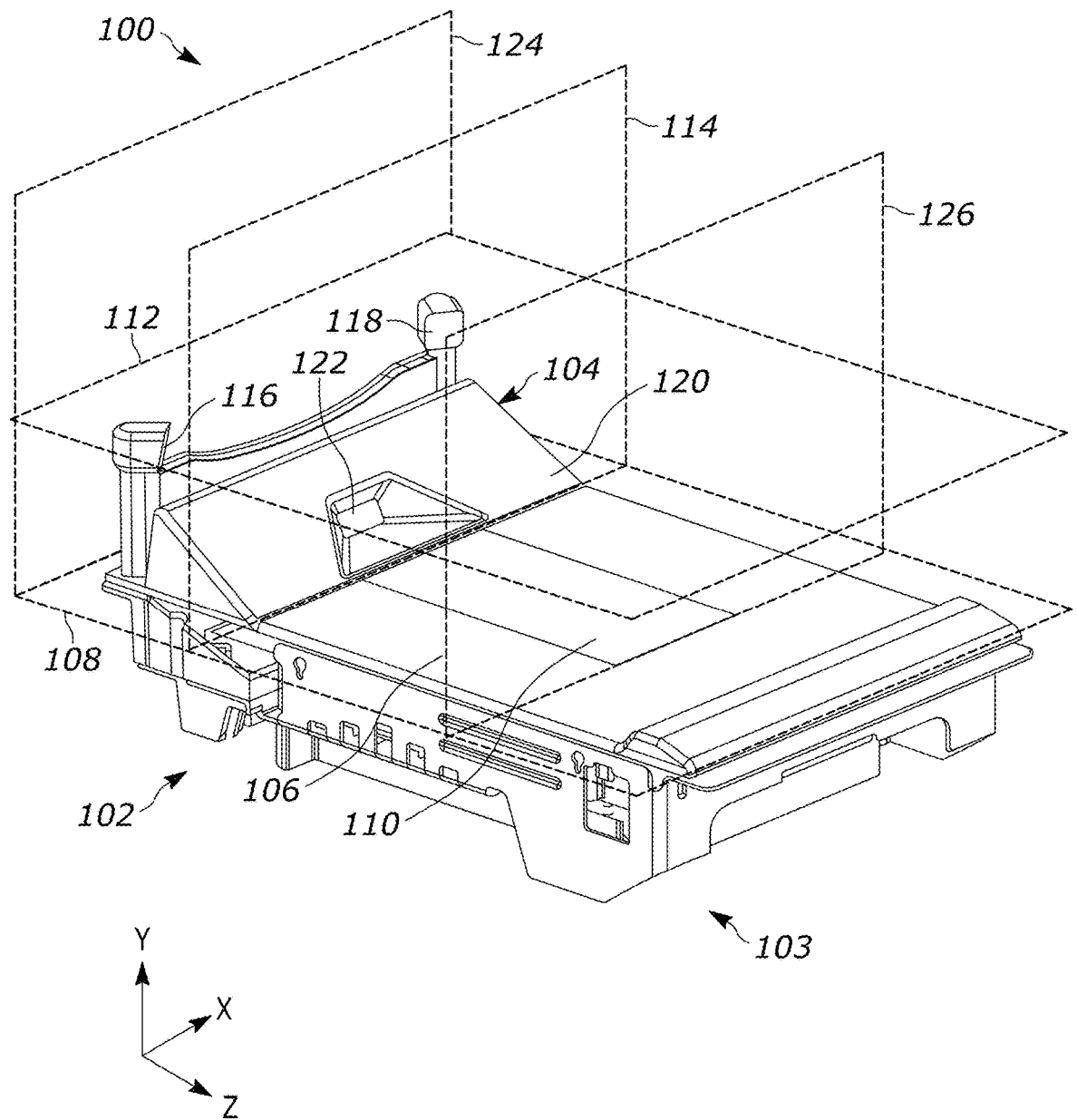
FIG. 1 illustrates a tri-optic indicia reader, according to embodiments of the present disclosure.

FIG. 1 illustrates an indicia reader 100 (e.g., tri-optic indicia reader), operable to utilize various imaging assembly configurations in accordance with embodiments of the present disclosure. As used herein, the term indicia should be understood to refer to any kind of visual marker that can be associated with an item. For example, indicia can be a 1D, 2D, or 3D barcode, a graphic, a logo, etc. Additionally, indicia may comprise encoded payload data as, for example, is the case with a 1D or 2D barcode where the barcode encodes a payload comprised of, for example, alphanumeric or special characters that may be formed into a string.

Generally, the indicia reader 100 includes a housing 102, which includes a lower housing portion 103, and an upper housing portion 104. The lower housing portion 103 includes a first surface 106. The first surface 106 includes a horizontal window 110 disposed in the first surface 106. According to one or more embodiments the horizontal window is an optically transmissive window. In some examples, the lower housing portion 103 may be configured such that the first surface 106 is a weigh platter, or a portion thereof, which may be part of a weigh platter assembly that generally includes the weigh platter and a scale (or load cell) configured to measure the weight of an object placed the top surface of the weight platter. By that virtue, the top surface of the weight platter may be considered to be the first surface 106 of the lower housing portion 103. A first reference plane, the first horizontal plane 108 is defined as the X-Z plane which is coplanar with the first surface 106 of the lower housing portion 103.

The figures contain illustrations of several reference planes, which are not features of the disclosed technology, by rather reference geometry included to improve understanding of various features of the disclosed technology, and more specifically, the physical orientations and locations of such features relative to one another. The reference planes illustrated in the figures include the first horizontal plane 108, a second horizontal plane 112, a first frontal plane 114, a second frontal plane 124, and a third frontal plane 126.

The second horizontal plane 112 is defined as the X-Z plane which contains the uppermost extent (in the Y-direction) of the upper housing portion 104. Said differently, the upper housing portion 104 is contained between the first horizontal plane 108 and the second horizontal plane 112. A first frontal plane 114 is defined as the X-Y plane which contains the forward-most extent (in the Z-direction) of the upper housing portion 104 and delineates the first surface 106 from the upper housing portion 104. A second frontal plane 124 is defined as the X-Y plane containing at the distal-most extent (in the Z direction) of the upper housing portion 104. In this manner, the upper housing portion is defined entirely within the space delineated by the first frontal plane 114, the second frontal plane 124, the first horizontal plane 108 and the second horizontal plane 112.

The upper housing portion 104 includes a first distal window 116 and a second distal window 118. According to some embodiments, both the first distal window 116 and the second distal window 118 are optically transmissive windows. In some examples, one or both the first distal window 116 and the second distal window 118 are oblique with respect to the first frontal plane 114. In some examples, one or both of the first distal window 116 and the second distal window 118 are oriented in a parallel manner with respect to the first frontal plane 114. Generally speaking, first distal window 116 and the second distal window 118 are oriented to be substantially "facing" the first frontal plane 114. the According to some embodiments, the first distal window 116 and the second distal window 118 are disposed in the upper distal corners of the upper housing portion 104. In some examples, the first distal window 116 is distanced less than 2 inches from the second frontal plane 124. In some examples, the second distal window 118 is distanced less than 2 inches from the second frontal plane 124.

The upper housing portion 104 further includes an inclined surface 120, according to embodiments of the present disclosure. In some examples, the inclined surface 120 is included as a portion of the weigh platter assembly, and in other examples the inclined surface is distinct from the weigh platter assembly. According to some embodiments, the inclined surface 120 includes a recess 122 or recessed portion, in which one or more of a variety of instruments or components may be disposed. In some embodiments, the instrument or component disposed in the recess includes an imaging assembly, such as a camera, video camera, a scanner, an LED or LED array, or an optical reader. In some embodiments, the instrument or component disposed in the recess includes a speaker, a display, a sensor, or similar component. In some examples, the recess 122 is omitted from the inclined surface 120.

In operation, a user generally passes an item across a product scanning region of the indicia reader 100 in a swiping motion in some general direction. A product scanning region can be generally viewed as a region that extends above the first surface 106 and/or in front of the upper housing portion 104 where imaging assemblies (e.g., first imaging assembly 702, second imaging assembly 704, third imaging assembly 706, see FIG. 7) are operable to capture image-data of sufficient quality to perform imaging-based operations like decoding a barcode that appears in the obtained image-data. It should be appreciated that while items may be swiped past the indicia reader 100 in either direction, items may also be presented into the product scanning region by means other than swiping past the window(s). When the item comes into any of the fields of view of the reader, the indicium on the item is captured and decoded by the indicia reader 100.

Indicia readers 100 can utilize a variety of imaging assemblies and optical components to achieve the desired FOV(s) over which image-data can be captured and transmitted to a processing host (such as a decoder (aka decoder assembly), processor, or ASIC that may be internal to the indicia reader 100) for decoding of indicia and further utilization of the decoded payload data. For example, an imaging assembly may include an image sensor (also referred to as an imager or imaging sensor) that can be, for example, a two-dimensional CCD or a CMOS sensor that can be either a monochrome sensor or a color sensor having, for instance 5.1 megapixels. It should be appreciated that sensors having other pixel-counts (both below and above) are within the scope of this disclosure. These two-dimensional sensors generally include mutually orthogonal rows and columns of photosensitive pixel elements arranged to form a substantially flat square or rectangular surface. Such imagers are operative to detect light captured by an imaging lens assembly along a respective optical path or axis that normally traverses through either of the generally horizontal or generally upright window(s). In instances where multiple imaging assemblies are used, each respective imager and imaging lens assembly pair is designed to operate together for capturing light scattered, reflected, or emitted from indicia as pixel data over a respective FOV. In other instances, a single imaging assembly may be used to generate a single primary FOV which may be split, divided, and/or folded to generate multiple FOVs by way of splitter and/or fold mirrors (e.g., folding mirrors 724A-B, folding mirrors 744A-B, splitting mirror 764). In such cases, data collected from various portions of the imaging sensor may be evaluated as if it was obtained by an individual imaging assembly/imaging sensor.

Figure 2:
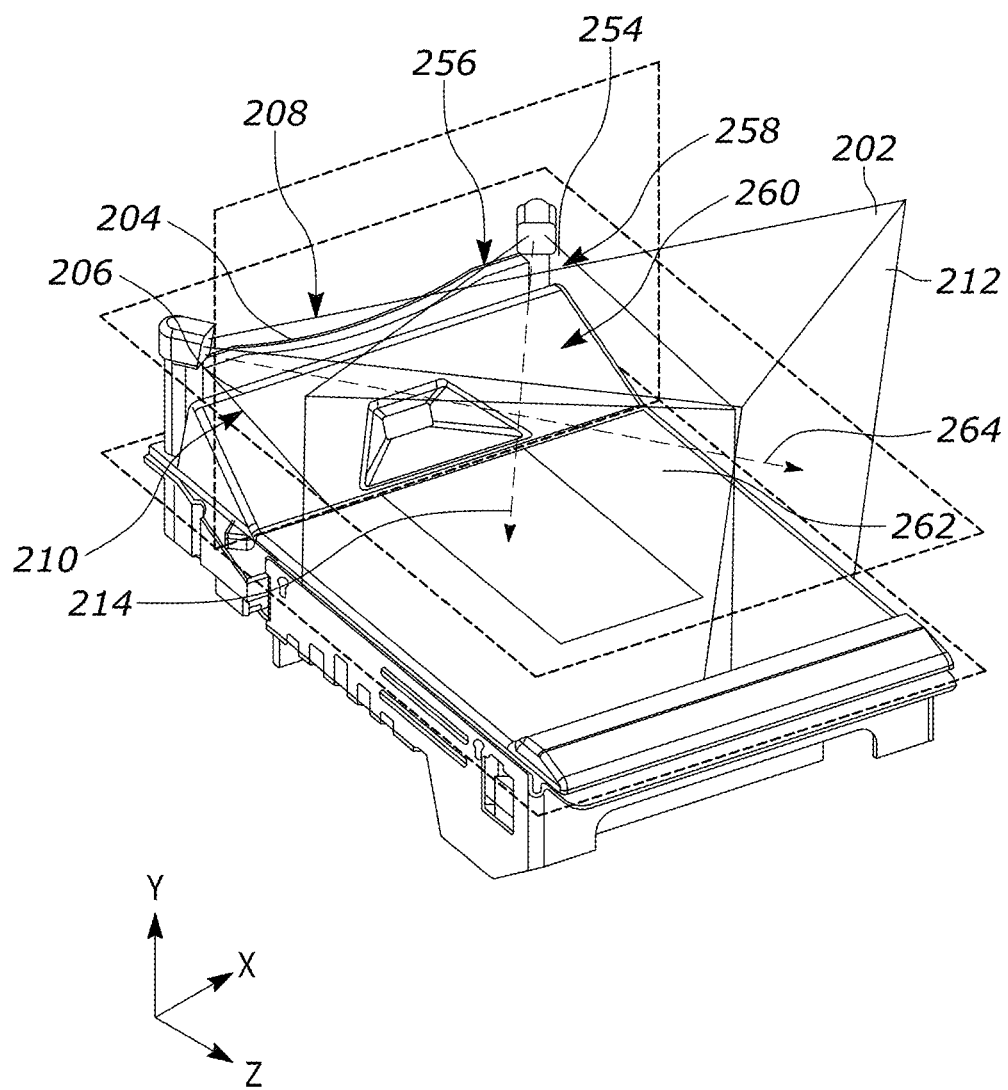
FIG. 2 illustrates a first view the tri-optic indicia reader of FIG. 1, in which a first field-of-view and a second field-of-view are viewable, according to embodiments of the present disclosure.

FIG. 2 illustrates a view of the indicia reader 100 where certain fields of view are viewable, according to embodiments of the present disclosure. The first distal window 116 is the apparent location of a first field-of-view ($FOV_1$) 201, which is the field-of-view (FOV) of a first imaging assembly 702 (See FIG. 7). The first imaging assembly 702 is configured to capture first image-data from the $FOV_1$ 202 which extends through the first distal window 116. The first distal window 116 is described to be the apparent location of the $FOV_1$ 202, as one viewing the indicia reader 100 may perceive that the $FOV_1$ 202 emanates from the first distal window 116. The first distal window 116 is disposed in a distal corner of the upper housing portion 104. In some examples, the first distal window may be housed in a tower-like structure, as is illustrated in FIG. 2. This disclosure contemplates embodiments wherein the first distal window 116 is be disposed in any of a variety of housings having various forms and features where the first distal window is disposed such that a gap exists between the first distal window 116 and the first frontal plane 114. The $FOV_1$ 202 has a $FOV_1$ upper boundary 204, an $FOV_1$ first lateral boundary 206, and $FOV_1$, second lateral boundary 208, and an $FOV_1$ lower boundary 210, and an $FOV_1$ working range, which is illustrated as a $FOV_1$ proximal boundary 212 for clarity. It will be understood that the $FOV_1$ 202 may extend beyond the working range of the $FOV_1$ 202 (and the $FOV_1$ proximal boundary 212), however the resolution of the first image-data received from the $FOV_1$ 202 beyond the working range of the $FOV_1$ 202 may be insufficient for reading indicia contained therein. The $FOV_1$ 202 further includes an $FOV_1$ central axis 214, along which the working range is defined. The $FOV_1$ lower boundary 210 is disposed below the $FOV_1$ upper boundary 204, such that the $FOV_1$ lower boundary 210 is closer to the first surface 106 than the $FOV_1$ upper boundary 204.

The second distal window 118 is the apparent location of a second field-of-view ($FOV_2$) 252 which is the field-of-view of a second imaging assembly 704 configured to capture second image-data from the $FOV_2$ 252 which extends through the second distal window 118. The second distal window 118 is described to be the apparent location of the $FOV_2$ 252, as one viewing the indicia reader 100 may perceive that the $FOV_2$ 252 emanates from the second distal window 118. In some examples, the second distal window 118 may be housed in a tower-like structure, as is illustrated in FIG. 2. This disclosure contemplates embodiments wherein the second distal window 118 is be disposed in any of a variety of housings having various forms and features where the second distal window 118 is disposed such that a gap exists between the second distal window 118 and the first frontal plane 114. The $FOV_2$ 252 has a $FOV_2$ upper boundary 254, an $FOV_2$ first lateral boundary 256, and $FOV_2$, second lateral boundary 258, and an $FOV_2$ lower boundary 260, and an $FOV_2$ working range, which is illustrated as a $FOV_2$ proximal boundary 262 for clarity. It will be understood that the $FOV_2$ 252 may extend beyond the working range of the $FOV_2$ 252 (and the $FOV_2$ proximal boundary 262), however the resolution of the first image-data received from the $FOV_2$ 252 beyond the working range of the $FOV_2$ 252 may be insufficient for reading indicia contained therein. The $FOV_2$ 252 further includes an $FOV_2$ central axis 264, along which the working range is defined. The $FOV_2$ lower boundary 260 is disposed below the $FOV_2$ upper boundary 254, such that the $FOV_2$ lower boundary 260 is closer to the first surface 106 than the $FOV_2$ upper boundary 254.

The first distal window 116 and the second distal window 118 are oriented such that the $FOV_1$ and the $FOV_2$ emanate from points substantially behind (in the Z direction) the first frontal plane 114. In this manner, the $FOV_1$ and $FOV_2$ have space to expand in scope, and more specifically, extend in height (in the Y direction), before intersecting the first frontal plane 114. This feature provides for a greater scanning volume of the $FOV_1$ and the $FOV_2$ in the space above the platter (e.g., above the first surface 106). This feature also provides more room to move items through the scanning region of the indicia reader and may provide for an increased surface are of the platter, which may facilitate the process of weighing larger objects. Furthermore, this feature facilitates a reduced spatial footprint (e.g., with respect to the lower housing portion 103) of the portion of the upper housing portion 104 dedicated to providing the $FOV_1$ and the $FOV_2$.

Figure 3:
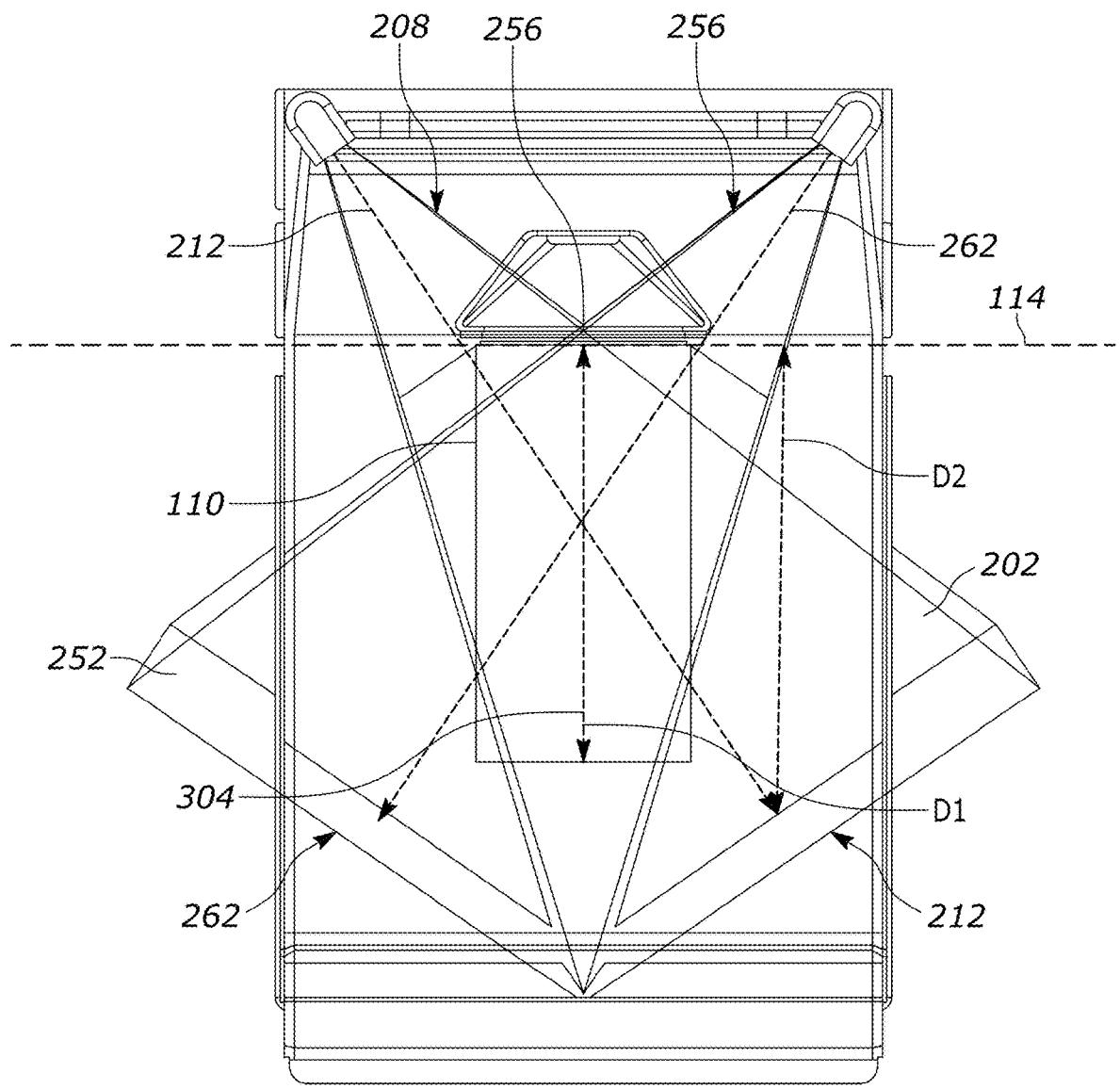
FIG. 3 illustrates an alternative view of the tri-optic indicia reader of FIG. 1, in which the first field-of-view and the second field-of-view are viewable, according to embodiments of the present disclosure.

FIG. 3 illustrates a planar view of the indicia reader 100, where the $FOV_1$ and the $FOV_2$ are viewable, according to embodiments of the present disclosure. According to one or more embodiments, the $FOV_1$ second lateral boundary 208 intersects the $FOV_2$ first lateral boundary 256, on a distal side of the first frontal plane 114. Said differently, the intersection between the $FOV_1$ first lateral boundary 206 and the $FOV_2$ second lateral boundary 258 is disposed on a side of the first frontal plane including the upper housing portion 104.

According to some embodiments, a total intersecting volume of the $FOV_1$ 202 and the $FOV_2$ 252 is of such dimensions that the intersecting volume contains an orthogonal bisector 304 of the horizontal window 110, which is oriented along the Z direction. In some examples, the orthogonal bisector is independently contained by each of the $FOV_1$ 202, and the $FOV_2$ 252. A length the orthogonal bisector D1 may be used to define a length of the horizontal window 110. According to some embodiments, the length of the horizontal bisector D1 and the horizontal window 110 is at least 6.5 inches. In some examples, the length of the horizontal bisector D1 and the horizontal window 110 is eight inches.

According to some embodiments, the working range of the $FOV_1$ 202 is configured such that a distance D2, measured orthogonally from the first frontal plane 114 to a point at which the $FOV_2$ central axis 214 intersects the $FOV_1$ proximal boundary 212 is at least 7 inches. Said differently, the distance D2 is the distance between a point on the $FOV_1$ central axis 214 corresponding to a maximum extent of the $FOV_1$ working range and the first frontal plane 114, measured orthogonally from the first frontal plane 114. In some examples, D2 is a perpendicular distance between the first frontal plane 114 and a point on the $FOV_1$ central axis 214 at which the $FOV_1$ working range terminates. With respect to the $FOV_2$ 252, in embodiments where the first imaging assembly 702 and the second imaging assembly 704 are sufficiently similar (e.g., identical and mirrored), D2 also represents the distance between a point on the $FOV_2$ central axis 264 corresponding to a maximum extent of the $FOV_2$ working range and the first frontal plane 114, measured orthogonally from the first frontal plane 114. In some examples, D2 is at least 7 inches. In some examples, D2 is at least 8 inches. D2 represents a "leading edged scanning distance" which is defined as an upper bound on a distance from the first frontal plane 114 (measured in the Z-direction) at which the first or second image-data corresponding to an indicium passing (in the X direction, and oriented substantially in a Y-Z plane) through the $FOV_1$ 202 or $FOV_2$ 252 (respectively) is of sufficient quality (e.g., clarity, resolution) to be read (e.g., decoded) by a visual data analysis module in electrical communication with at least one of the first imaging assembly and the second imaging assembly.

Figure 4:
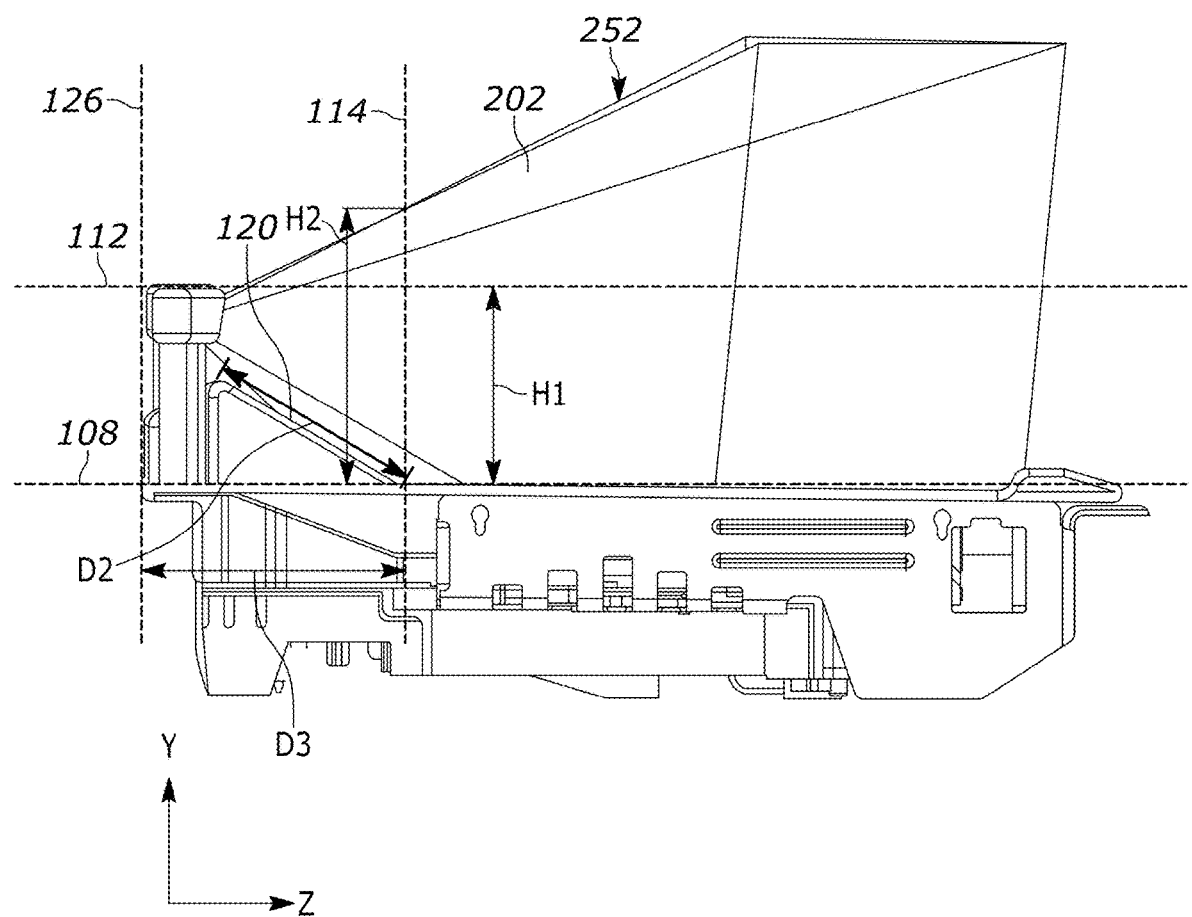
FIG. 4 illustrates yet another alternative view of the tri-optic indicia reader of FIG. 1, in which the first field-of-view and the second field-of-view are viewable.

FIG. 4 illustrates a side-profile view (e.g., Y-Z plane) of the indicia reader 100, according to embodiments of the present disclosure. The first horizontal plane 108 and the second horizontal plane 112 are parallel with one another and separated by a first height H1. The first height H1 is also the height of the upper housing portion 104. Accordingly, the second horizontal plane 112 intersects the first frontal plane 114 at a distance from the first horizontal plane 108 equivalent to the first height H1. According to some embodiments, the $FOV_1$ 202 and the $FOV_2$ 252, are configured such that the $FOV_1$ upper boundary 204 and the $FOV_2$ upper boundary 254 intersect the first frontal plane 114 at a second height H2 above the first horizontal plane 108. According to one ore more embodiments, the second height H2 is greater than the first height H1. Said differently, the $FOV_1$ 202 and the $FOV_2$ 252 encapsulate a volume such that at the first frontal plane 114, the upper bounds of both the $FOV_1$ 202 and the $FOV_2$ 252 are above the height of the upper housing portion 104 (e.g., the second horizontal plane 112). Thus, the indicia reader 100 is configured to read first image-data (e.g., when received from the $FOV_1$) or second image-data (e.g., when received from the $FOV_2$) of an indicium passed through the $FOV_1$ 202 or $FOV_2$ 252 (respectively) at points on the distal side of the first frontal plane 114, and above the second horizontal plane 112.

According to some embodiments, the indicia reader 100 may be configured such that the $FOV_1$ lower boundary 210 and the $FOV_2$ lower boundary 260 are substantially aligned with the inclined surface 120. In this manner, the inclined surface 120 serves as a physical barrier, which prevents, or substantially restricts, an indicum from being passed below the $FOV_1$ lower boundary 210 and the $FOV_2$ lower boundary 260, which may reduce the probability that image-data corresponding to the indicum is not received by the indicia reader 100 when the indicum is engaged therewith.

According to some embodiments, a length D2 of the inclined surface, as measured in the X-Y plane, is at least 50 percent of the length D3, which is given by the perpendicular distance between the first frontal plane 114 and the second frontal plane 124.

Figure 5:
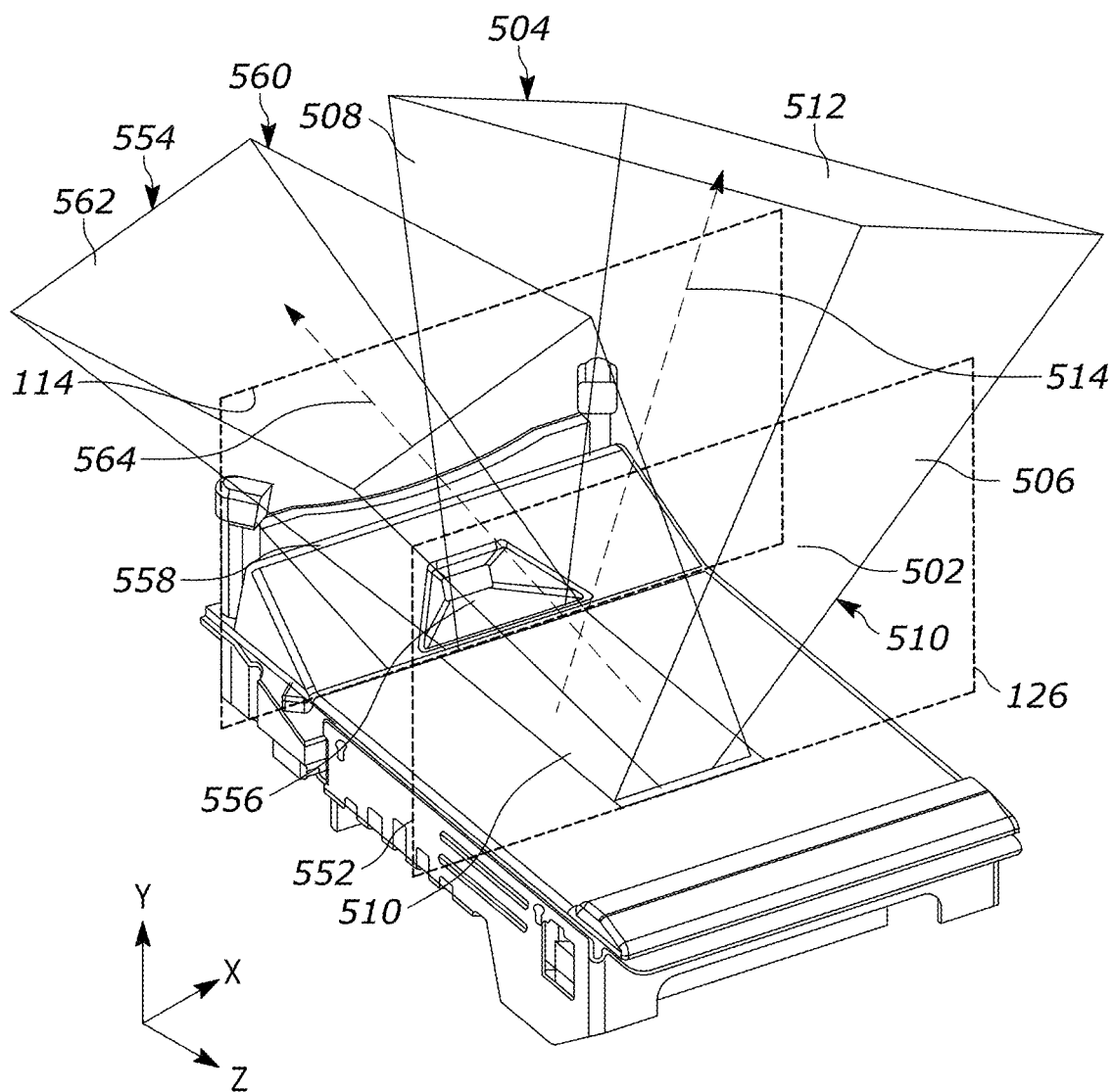
FIG. 5 illustrates a view of the tri-optic indicia reader of FIG. 1, in which a third field-of-view and a fourth field-of-view are viewable, according to embodiments of the present disclosure.
Figure 6:
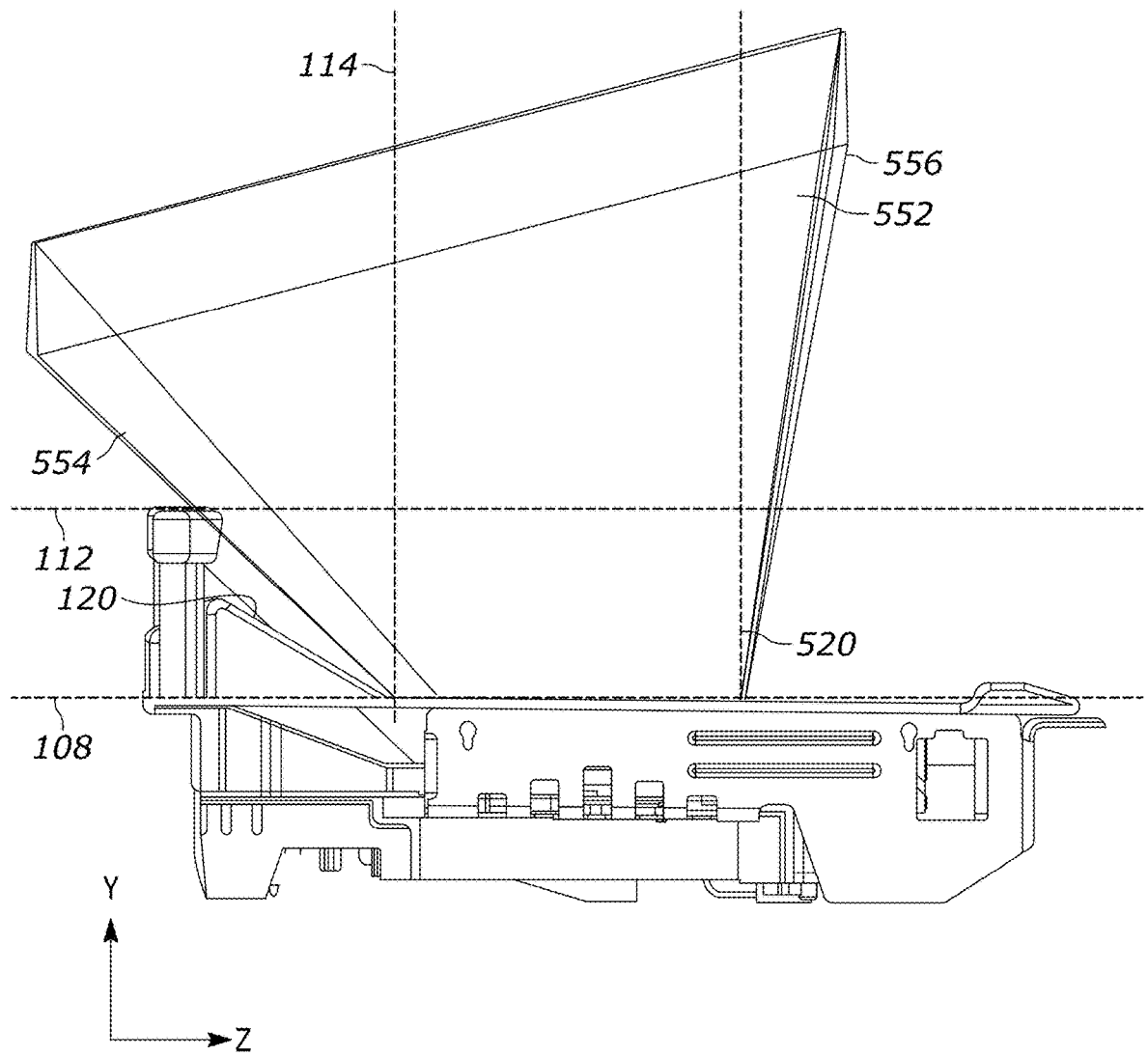
FIG. 6 illustrates another view of the tri-optic indicia reader of FIG. 1, in which the third field-of-view and the fourth field-of-view are viewable, according to embodiments of the present disclosure.

FIG. 5 illustrates a perspective view of the indicia reader 100, in which some fields of view are viewable, according to embodiments of the present disclosure. A third frontal plane 126 is also illustrated in FIG. 6. The third frontal plane 126 is defined upwards from a proximal edge of the horizontal window 110 and is parallel to the first frontal plane 114 (e.g., and perpendicular to both the first horizontal plane 108 and the second horizontal plane 112). The third frontal plane 126 is a reference plane, and not a physical feature of the disclosed technology. The horizontal window 110 is the apparent location of a third FOV ($FOV_3$) 502 and a fourth FOV ($FOV_4$) 552, which are fields-of-view of a third imaging assembly 706 (See FIG. 7). The third imaging assembly 706 is configured to capture third image-data over the $FOV_3$ 502 and the $FOV_4$ 552, both of which extend through the horizontal window 110. The horizontal window 110 is described to be the apparent location of the $FOV_3$ 502 and the $FOV_4$ 552, as one viewing the indicia reader 100 may perceive that the $FOV_3$ 502 and the $FOV_4$ 552 emanate from the horizontal window 110. According to some embodiments, the portion of the horizontal window 110 through which the $FOV_3$ and the $FOV_4$ collectively pass through has a surface area not less than 90% of the total surface area of the horizontal window 110.

The $FOV_3$ has an $FOV_3$ distal boundary 504, an $FOV_3$ proximal boundary 506, a $FOV_3$ first lateral boundary 508, and a $FOV_3$ second lateral boundary 510, and an $FOV_3$ working range, which is illustrated as an $FOV_3$ upper boundary 512 and measured along an $FOV_4$ central axis 514. The $FOV_4$ has an $FOV_4$ distal boundary 554, an $FOV_4$ proximal boundary 556, a $FOV_4$ first lateral boundary 558, and a $FOV_4$ second lateral boundary 560, and an $FOV_4$ working range, which is illustrated as an $FOV_4$ upper boundary 562 and measured along an $FOV_4$ central axis 564.

FIG. 6 illustrates a profile view of the indicia reader 100 (Y-Z plane) in which the $FOV_3$ 502 and the $FOV_4$ 552 are viewable, according to embodiments of the present disclosure. According to some embodiments, the indicia reader 100 is configured such that the $FOV_3$ distal boundary 504 intersects the first frontal plane 114 between the first horizontal plane 108 and the second horizontal plane 112 such that the third image-data is receivable by the third imaging assembly 706 from an indicium appearing in a volume bounded by the $FOV_3$ first lateral boundary 508, the $FOV_3$ second lateral boundary 510, the $FOV_3$ upper boundary 512, the $FOV_3$ distal boundary 504 and the first frontal plane 114. According to some embodiments, the indicia reader 100 is configured such that the $FOV_4$ distal boundary 554 intersects the first frontal plane 114 between the first horizontal plane 108 and the second horizontal plane 112 such that the third image-data is receivable by the third imaging assembly 706 from an indicium appearing in a volume bounded by the $FOV_4$ first lateral boundary 558, the $FOV_4$ second lateral boundary 560, the $FOV_4$ upper boundary 562, the $FOV_4$ distal boundary 554 and the first frontal plane 114.

Said differently, the $FOV_4$ 552 and the $FOV_3$ 502 are configured such that the $FOV_3$ distal boundary 504 and the $FOV_4$ distal boundary 554 are oriented at an angle with respect to the Y-direction (and the first frontal plane 114) such that the $FOV_3$ 502 and the $FOV_4$ 552 are operable to capture image-data from indicia appearing in certain locations on the distal side of the first frontal plane 114. According to some embodiments, the inclined surface 120 of the upper housing portion 104 may be substantially aligned with the $FOV_3$ distal boundary 504 and the $FOV_4$ distal boundary 554. In this manner, the inclined surface 120 serves as a physical barrier, which prevents, or substantially restricts, an indicum from being passed behind the $FOV_3$ distal boundary 504 and the $FOV_4$ distal boundary 554, which may reduce the probability that image-data corresponding to the indicum is not received by the indicia reader 100 when the indicum is engaged therewith.

According to some embodiments, the $FOV_4$ 502 and the $FOV_3$ 552 are further configured such that the $FOV_3$ proximal boundary 506 and the $FOV_4$ proximal boundary 556 extend forward past the third frontal plane 126. Said differently, the $FOV_3$ 502 and the $FOV_4$ 552 are operable to capture image-data from indicia appearing in certain locations on the proximal side of the third frontal plane 126.

Figure 7A:
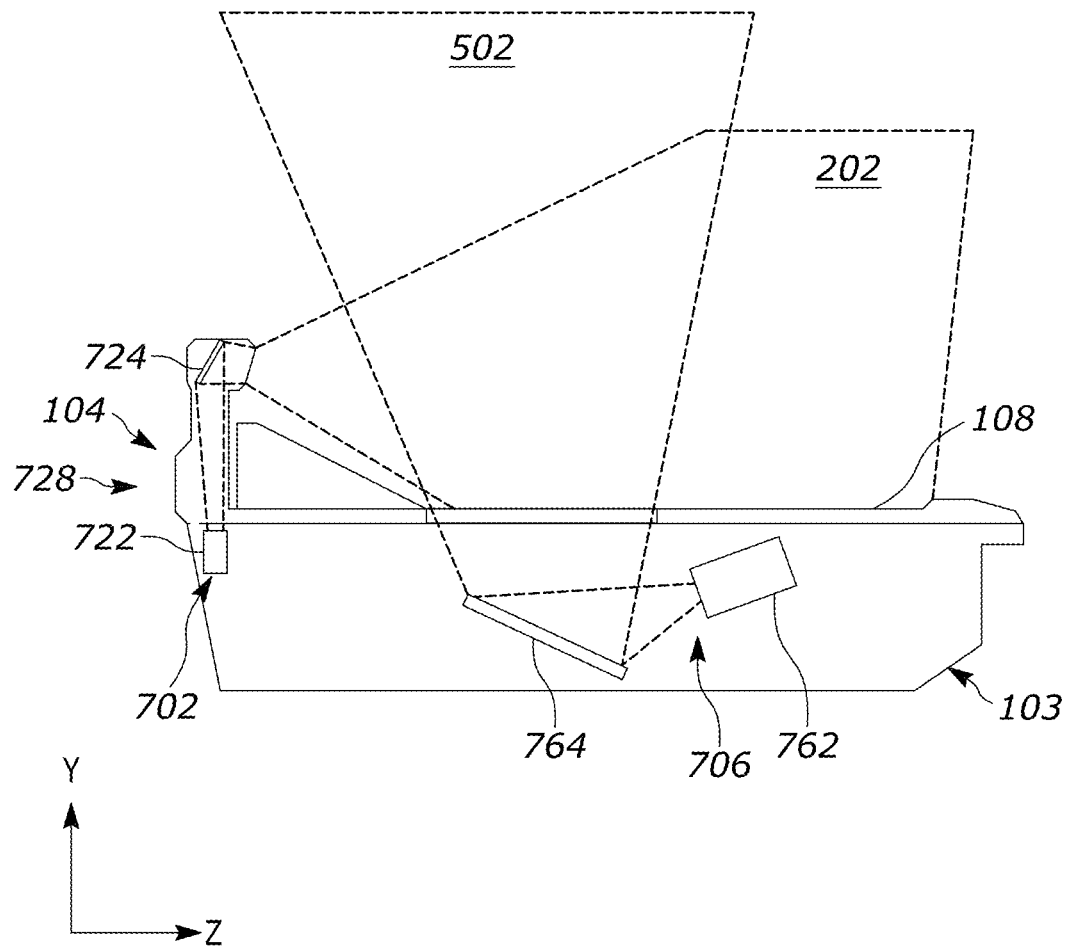
FIGS. 7A-7B illustrates simplified views of imaging assemblies, mirrors and fields-of-view included in the tri-optic indicia reader of FIG. 1, according to embodiments of the present disclosure.
Figure 7B:
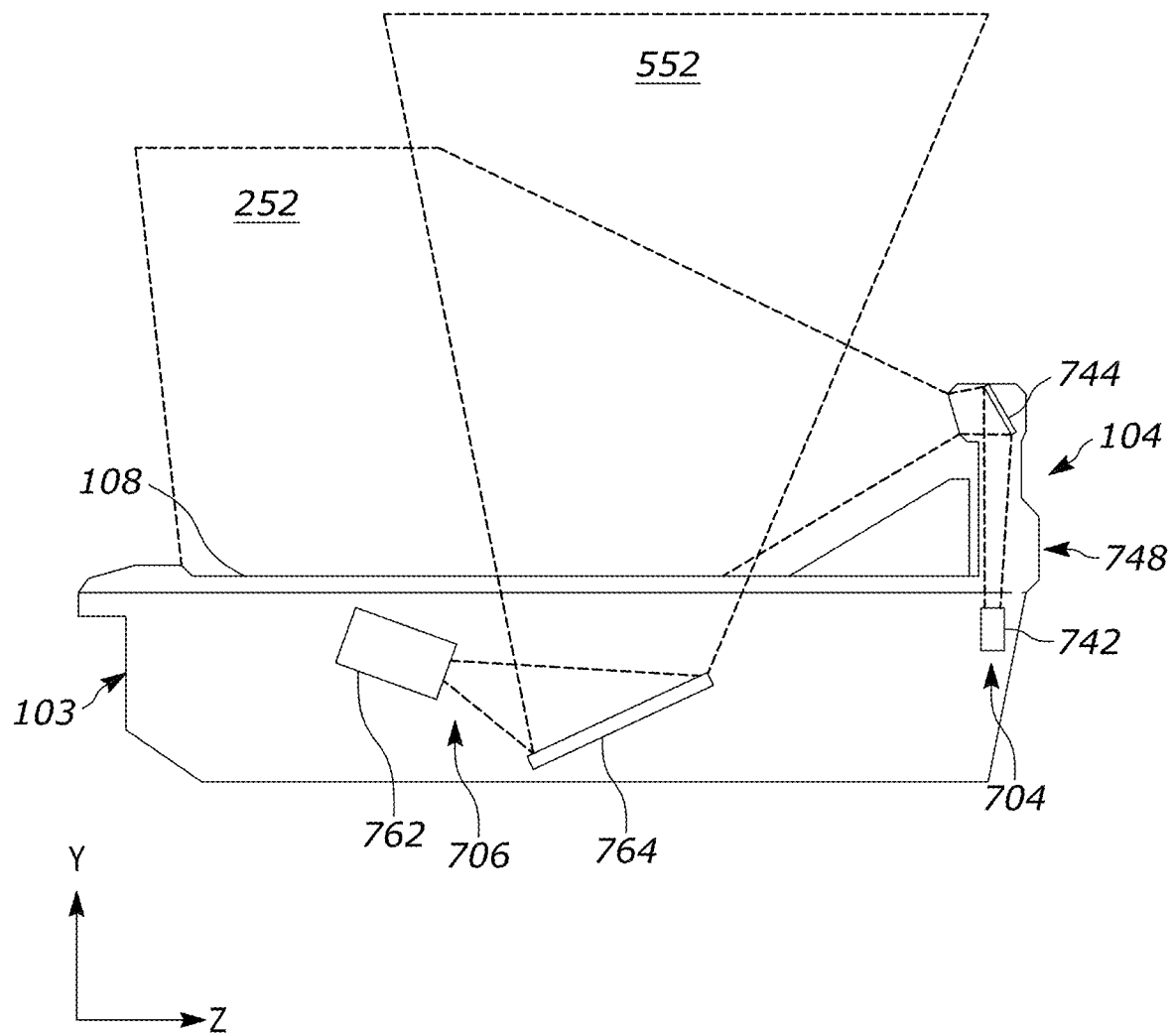

FIGS. 7A-7B illustrate a simplified views of certain internal components of the indicia reader 100, according to embodiments of the present disclosure. FIG. 7A illustrates a first simplified section view of the indicia reader 100, and FIG. 7B illustrates a second simplified section view of the indicia reader 100, on an opposite side to the first simplified section view. The following discussion is made with reference to FIG. 7A and FIG. 7B simultaneously.

According to some embodiments, the first imaging assembly 702 may include a first image sensor 722, and one or more folding mirrors 724. In some examples, the first image sensor 722 is disposed in the lower housing portion 103 (e.g., below the first horizontal plane), and the $FOV_1$ 202 is folded by the folding mirror 724 such that first image-data is receivable to the first image sensor 722 from the $FOV_1$. In some examples, the first imaging assembly 702 may include more than the single illustrated folding mirror 724, and may include two, three, four, five, or any number of folding mirrors 724 without departing from the scope of this disclosure. In some examples, the first imaging assembly 702, (e.g., the first image sensor) may be disposed in the upper housing portion 104, at a location proximate to the illustrated location of the folding mirror 724. In some examples, the first image sensor 722 may be disposed in a first lower distal corner 728 of the upper housing portion 104, and the $FOV_1$ 202 emanates therefrom, folded by the folding mirrors 724 to the first distal window 116.

The second imaging assembly 704 is substantially mirrored with respect to the first imaging assembly 702. The second imaging assembly may include one or more folding mirrors 744 configured to fold the $FOV_2$ 252 such that second image-data is capturable over the $FOV_2$ 252 by a second image sensor 742. In some examples the second image sensor 742 is disposed in the lower housing portion 103 (e.g., below the first horizontal plane 108). In some examples, the second imaging assembly 704 may include more than the single illustrated folding mirrors 744, and may include two, three, four, five, or any number of folding mirrors 744 without departing from the scope of this disclosure. In some examples, the second imaging assembly 704, (e.g., the second image sensor 742) may be disposed in the upper housing portion 104, at a location proximate to the illustrated location of the folding mirror 744. In some examples, the second image sensor 742 may be disposed in a second lower distal corner 748 of the upper housing portion 104, and the $FOV_1$ emanates therefrom, folded by the folding mirrors 744 to the first distal window 116.

The third imaging assembly 706 is disposed in the lower housing portion 103, and in the general vicinity of the horizontal window 110, according to embodiments of the present disclosure. The third imaging assembly 706 may include a third image sensor 762, and a plurality of folding mirrors and at least one splitting mirror 764. In the illustrated embodiment, the mirrors associated with the third imaging assembly 706 have been illustrated as a single mirror (e.g., splitting mirror 764) for simplicity, however it is understood that practically applied, the third imaging assembly 706 may include several folding mirrors and one or more splitting mirrors 764, such that the third image sensor 762 is configurable to capture second image-data and third image-data over the $FOV_3$ 502 and the $FOV_4$ 552 respectively. According to some embodiments, the $FOV_3$ 502 and the $FOV_4$ 552 are folded and unified towards the third image sensor 762 via a plurality of third mirrors (e.g., splitting mirror 764).

According to some embodiments, one or more of the first image sensor 722, the second image sensor 742, and the third image sensor 762, may include a camera having a 5.1-megapixel (MP) resolution. 5.1 MP cameras may provide for greater resolution of image data of indicia scanned by the indicia reader 100 when compared to lower resolution cameras (e.g., 2.3 MP cameras, etc.). Use of 5.1 MP cameras may also facilitate an improved capability of the indicia reader 100 to decode indicia of smaller sizes, such as 15-mil Global Standards-1 (GS1) barcodes and 100% universal product codes (UPC).

Figure 8:
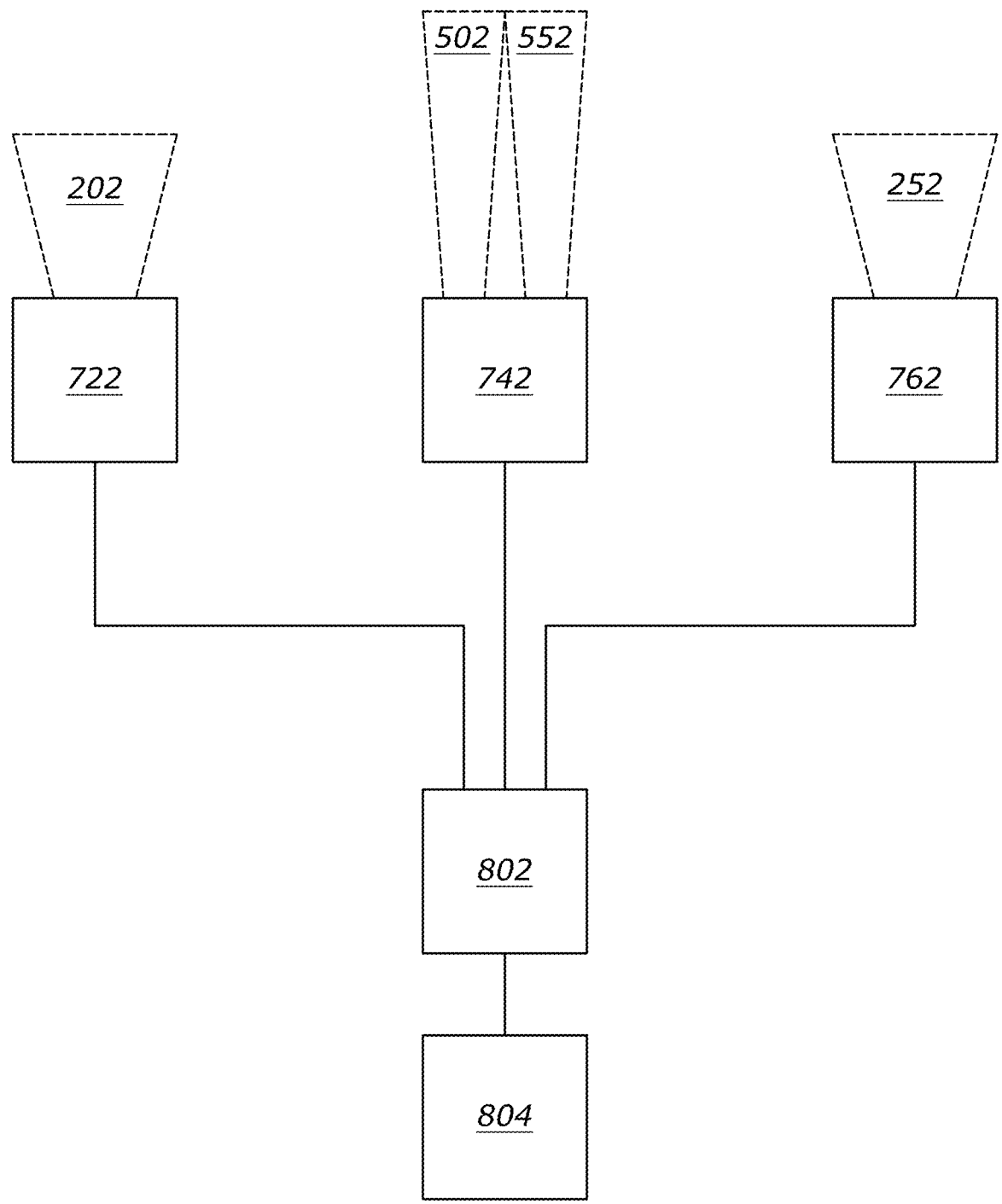
FIG. 8 illustrates a simplified schematic of imaging assemblies and a visual data analysis module included in the tri-optic indica reader of FIG. 1, according to embodiments of the present disclosure.

FIG. 8 illustrates a simplified schematic of the connections between the image sensors (e.g., first image sensor 722, second image sensor 742, third image sensor 762) and a visual data analysis module 802, according to embodiments of the present disclosure. The first image sensor 722 collects first image-data over the $FOV_1$ 202 (e.g., via the first imaging assembly 702), and transmits the first image-data to the visual data analysis module 802. The second image sensor 742 collects second image-data over the $FOV_2$ 252 (e.g., via the second imaging assembly 704), and transmits the second image-data to the visual data analysis module 802. The third image sensor 762 collects third image-data over the $FOV_1$ 502 and the $FOV_4$ 552 (e.g., via the third imaging assembly 706), and transmits the third image-data to the visual data analysis module 802. The visual data analysis module is configured to perform imaging-based operations such decoding image-data of a barcode that appears in the respective FOV of one of the image sensors. The visual data analysis module 802 may then transmit data produced by the imaging-based operation to a host device. According to some embodiments, the host device may be a point-of-sale system.

According to some embodiments, the visual data analysis module 802 is configured to analyze image-data received from one of the first image sensor 722, the second image sensor 742, and the third image sensor 762. The image data may be collected from a scanning region, where the scanning region is defined as a union of the $FOV_1$ 202, the $FOV_2$ 252, the $FOV_3$ 502, and $FOV_4$ 552. When a readable indicium is passed through the scanning region, image-data corresponding to the indicium is communicated to the visual data analysis module 802 by one or more of the image sensors (e.g., the first image sensor 722, the second image sensor 742, and the third image sensor 762) to be analyzed, decoded or otherwise read.

As used herein, the term "horizontal" is used to describe a plane, or feature defined the plane, the plane being defined by characteristic vectors in the X direction and the Z direction.

As used herein, the term frontal is used to describe a plane, or feature defined in the plane, the plane being defined by characteristic vectors in the X direction and the Y direction.

As used herein, the term "lateral" may be used to describe a plane, or feature defined in the plane, the plane being defined by characteristic direction vectors in the Y direction and the Z direction. In some examples, a "lateral" plane, or feature in a "lateral" plane, may include a characteristic direction vector in the X direction of a substantially lower magnitude than that of the characteristic direction vectors in the Y direction and the Z direction.

As used herein the term "distal" may be used to describe a feature that is closer to an origin of the dimensional system in the Z direction, relative to another feature.

As used herein, the term "proximal" may be used to describe a feature that is further from the origin of the dimensional system in the Y direction, relative to another feature.

In the case of indicia readers 100, features described as "proximal" are generally closer to a user than features described as "distal", in orientation where the user faces the origin, and the indicia reader is oriented between the origin of the dimensional system and the user.

As used herein, the term "upper" may be used to describe a feature that is further from the origin of the dimensional system in the Y direction, relative to another feature.

As used herein, the term "lower" may be used to describe a feature that has a lower positional value in the Y-direction, relative to another feature.

As used herein, the term "above" may be used to describe a feature that has a higher positional value in the Y-direction, relative to another feature.

As used herein, the terms "beneath" and "below" may be used to describe a feature that has a lower positional value in the Y-direction, relative to another feature.

As used herein, the term "forward" may be used to describe a feature that has a higher positional value in the Z-direction, relative to another feature.

Certain terms are used throughout the description and claims to refer to particular features or components. As one skilled in the art will appreciate, different persons may refer to the same feature or component by different names. This document does not intend to distinguish between components or features that differ in name but not function.

As used herein, "about," "approximately" and "substantially" are understood to refer to numbers in a range of the referenced number, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole numbers, or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in the present disclosure, a phrase referring to "at least one of" a list of items refers to any set of those items, including sets with a single member, and every potential combination thereof. For example, when referencing "at least one of A, B, or C" or "at least one of A, B, and C", the phrase is intended to cover the sets of: A, B, C, A-B, B-C, and A-B-C, where the sets may include one or multiple instances of a given member (e.g., A-A, A-A-A, A-A-B, A-A-B-B-C-C-C, etc.) and any ordering thereof. For avoidance of doubt, the phrase "at least one of A, B, and C" shall not be interpreted to mean "at least one of A, at least one of B, and at least one of C".

As used in the present disclosure, the term "determining" encompasses a variety of actions that may include calculating, computing, processing, deriving, investigating, looking up (e.g., via a table, database, or other data structure), ascertaining, receiving (e.g., receiving information), accessing (e.g., accessing data in a memory), retrieving, resolving, selecting, choosing, establishing, and the like.

Without further elaboration, it is believed that one skilled in the art can use the preceding description to use the claimed technology to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

Within the claims, reference to an element in the singular is not intended to mean "one and only one" unless specifically stated as such, but rather as "one or more" or "at least one". Unless specifically stated otherwise, the term "some" refers to one or more. No claim element is to be construed under the provision of 35 U.S.C. § 112(f) unless the element is expressly recited using the phrase "means for" or "step for". All structural and functional equivalents to the elements of the various embodiments described in the present disclosure that are known or come later to be known to those of ordinary skill in the relevant art are expressly incorporated herein by reference and are intended to be encompassed by the claims. Moreover, nothing disclosed in the present disclosure is intended to be dedicated to the public regardless of whether such disclosure is explicitly recited in the claims.

The invention claimed is:

1. An indicia reader, comprising:
a housing;
a lower housing portion of the housing having a first surface defining a first horizontal plane,
a horizontal window disposed in the first surface;
an upper housing portion extending above the first horizontal plane, the upper housing portion bounded by a first frontal plane and a second horizontal plane, the first frontal plane being perpendicular to the first horizontal plane and defined by a forward extent of the upper housing portion, the second horizontal plane being parallel to the first horizontal plane and defined by an upward extent of the upper housing portion;
a first distal window disposed in a first distal corner of the upper housing portion;
a second distal window disposed in a second distal corner of the upper housing portion;
a first imaging assembly having a first imaging sensor, the first imaging assembly configured to capture first image-data from a first field of view ($FOV_1$) extending through the first distal window, the $FOV_1$ having an $FOV_1$ central axis, an $FOV_1$ working range defined along the $FOV_1$ central axis, an $FOV_1$ upper boundary, an $FOV_1$ lower boundary, an $FOV_1$ first lateral boundary, and an $FOV_1$ second lateral boundary, the $FOV_1$ lower boundary being closer to the first horizontal plane than the $FOV_1$ upper boundary;
a second imaging assembly having a second imaging sensor, the second imaging assembly configured to capture second image-data from a second field of view ($FOV_2$) extending through the second distal window, the $FOV_2$ having an $FOV_2$ central axis, an $FOV_2$ working range defined along the $FOV_2$ central axis, an $FOV_2$ upper boundary, an $FOV_2$ lower boundary, an $FOV_2$ first lateral boundary, and an $FOV_2$ second lateral boundary, the $FOV_2$ lower boundary being closer to the first horizontal plane than the $FOV_2$ upper boundary;
a scanning region, defined by a union of at least the $FOV_1$ and the $FOV_2$;
wherein the second horizontal plane intersects the first frontal plane at a first height relative to the first surface, the $FOV_1$ upper boundary intersects the first frontal plane at second height relative to the first surface, the $FOV_2$ upper boundary intersects the first frontal plane at third height relative to the first surface, and at least one of:

the second height is greater than the first height, and the third height is greater than the first height; and a visual data analysis module configured to analyze at least one of the first image-data and the second image-data to decode data corresponding to an indicium appearing in at least one of the first image-data and the second image-data.

2. The indicia reader of claim 1, wherein at least one of:
a) the first imaging sensor is disposed beneath the first horizontal plane, and the $FOV_1$ is folded via a first folding mirror disposed proximately to the first distal window,
b) the second imaging sensor is disposed beneath the first horizontal plane, and the $FOV_2$ is folded via a second folding mirror disposed proximately to the second distal window,
c) the first imaging sensor is disposed in a first lower distal corner of the upper housing portion, and
d) the second imaging sensor is disposed in a second lower distal corner of the upper housing portion.

3. The indicia reader of claim 1, wherein at least one of:
a) the first distal window is spaced away from a second frontal plane defined by a distal extent of the upper housing portion, by a distance not more than 2 inches, and
b) the second distal window is spaced away from a second frontal plane defined by a distal extent of the upper housing portion, by a distance not more than 2 inches.

4. The indicia reader of claim 1, wherein at least one of:
a) the first distal window is oriented obliquely with respect to the first frontal plane, and
b) the second distal window is oriented obliquely with respect to the first frontal plane.

5. The indicia reader of claim 1, wherein the upper housing portion includes an inclined surface aligned with at least one of:
(a) the $FOV_1$ lower boundary, and
(b) the $FOV_2$ lower boundary.

6. The indicia reader of claim 5, wherein the inclined surface has a length which measures at least 50% of a distance between the first frontal plane and a second frontal plane defined by a distal extent of the upper housing portion.

7. The indicia reader of claim 5, wherein the inclined surface includes a recess including at least one selected from a group consisting of an inclined window, a fourth imaging sensor, a camera, an LED, and combinations thereof.

8. The indicia reader of claim 1, wherein at least one of:
(a) a perpendicular distance between the first frontal plane and a point on the $FOV_1$ central axis at which the $FOV_1$ working range terminates is greater than 7 inches, and
(b) a perpendicular distance between the first frontal plane and a point on the $FOV_2$ central axis at which the $FOV_2$ working range terminates is greater than 7 inches.

9. The indicia reader of claim 1, wherein the first imaging assembly and the second imaging assembly are configured such that an intersection between the $FOV_1$ first lateral boundary and the $FOV_2$ second lateral boundary is disposed on a side of the first frontal plane including the upper housing portion.

10. The indicia reader of claim 1, wherein a length of the horizontal window is greater than 6.5 inches, the length measured in a direction perpendicular to the first frontal plane.

11. The indicia reader of claim 1, further comprising a third imaging assembly having a third imaging sensor, the third imaging assembly configured to capture third image-data from a third field of view ($FOV_3$) and fourth field of view ($FOV_4$), both the $FOV_3$ and the $FOV_4$ extending though the horizontal window, wherein the $FOV_3$ and the $FOV_4$ contain a surface area of the horizontal window greater than 90% of a total surface area of the horizontal window.

12. The indicia reader of claim 1, wherein the horizontal window defines an orthogonal bisector, and the orthogonal bisector is independently contained by each of the $FOV_1$, and the $FOV_2$.

13. An indicia reader, comprising:
a housing;
a lower housing portion of the housing having a first surface defining a first horizontal plane,
a horizontal window disposed in the first surface;
an upper housing portion extending beyond the first horizontal plane, the upper housing portion bounded by a first frontal plane and a second horizontal plane, the first frontal plane being perpendicular to the first horizontal plane and defined by a forward extent of the upper housing portion, the second horizontal plane being parallel to the first horizontal plane and defined by an upward extent of the upper housing portion;
a first distal window disposed in a first distal corner of the upper housing portion, oriented obliquely to the first frontal plane;
a second distal window disposed in a second distal corner of the upper housing portion, opposite the first distal corner, oriented obliquely to the first frontal plane;
a first imaging assembly having a first imaging sensor, the first imaging assembly configured to capture first image-data from a first field of view ($FOV_1$) extending through the first distal window, the $FOV_1$ having an $FOV_1$ central axis, an $FOV_1$ working range defined along the $FOV_1$ central axis, an $FOV_1$ upper boundary, an $FOV_1$ lower boundary, an $FOV_1$ first lateral boundary, and an $FOV_1$ second lateral boundary, the $FOV_1$ lower boundary oriented closer to the horizontal window than the $FOV_1$ upper boundary;
a second imaging assembly having a second imaging sensor, the second imaging assembly configured to capture second image-data from a second field of view ($FOV_2$) extending through the second distal window, the $FOV_2$ having an $FOV_2$ central axis, an $FOV_2$ working range defined along the $FOV_2$ central axis, an $FOV_2$ upper boundary, an $FOV_2$ lower boundary, an $FOV_2$ first lateral boundary, and an $FOV_2$ second lateral boundary, the $FOV_2$ lower boundary oriented closer to the horizontal window than the $FOV_2$ upper boundary;
a third imaging assembly having a third imaging sensor, the third imaging assembly configured to capture third image-data from a third field of view ($FOV_3$) and fourth field of view ($FOV_4$), both the $FOV_3$ and the $FOV_4$ extending though the horizontal window, the $FOV_3$ having an $FOV_3$ central axis, an $FOV_3$ proximal boundary, an $FOV_3$ distal boundary, and $FOV_3$ working range defined along the $FOV_3$ central axis, an $FOV_3$ first lateral boundary, and an $FOV_3$ second lateral boundary, and the $FOV_4$ having an $FOV_4$ central axis, an $FOV_4$ proximal boundary, an $FOV_4$ distal boundary, and an $FOV_4$ working range defined along the $FOV_4$ central axis, an $FOV_4$ first lateral boundary, and an $FOV_4$ second lateral boundary;
a scanning region defined by a union of the $FOV_1$, the $FOV_2$, the $FOV_3$, and the $FOV_4$;
wherein the $FOV_3$ distal boundary and the $FOV_4$ distal boundary respectively intersect the first frontal plane between the first horizontal plane and the second horizontal plane such that the third image-data is receivable by the third imaging sensor from an indicium appearing in at least one of:
  (a) a first volume bounded by the $FOV_3$ first lateral boundary, the $FOV_3$ second lateral boundary, the $FOV_3$ distal boundary and the first frontal plane, or
  (b) a second volume bounded by the $FOV_4$ first lateral boundary, the $FOV_4$ second lateral boundary, the $FOV_4$ distal boundary and the first frontal plane; and
a visual data analysis module configured to analyze at least one of:
  (a) the first image-data to decode data corresponding to an indicium appearing in the first image-data,
  (b) the second image-data to decode data corresponding to an indicium appearing in the second image-data, or
  (c) the third image-data to decode data corresponding to an indicium appearing in the third image-data.

14. The indicia reader of claim 13, wherein the upper housing portion includes an inclined surface which is substantially aligned with the $FOV_3$ distal boundary and the $FOV_4$ distal boundary such that the upper housing portion restricts access to a region defined behind the $FOV_3$ distal boundary and the $FOV_4$ distal boundary and above the first horizontal plane.

15. The indicia reader of claim 14, wherein the inclined surface includes a recess including at least one selected from a group consisting of an inclined window, a fourth imaging sensor, a camera, an LED, and combinations thereof.

16. The indicia reader of claim 13, wherein the horizontal window defines an orthogonal bisector, and the orthogonal bisector is independently contained by each of the $FOV_1$, the $FOV_2$, and the $FOV_3$.

17. The indicia reader of claim 13, wherein the $FOV_3$ and the $FOV_4$ contain a surface area of the horizontal window greater than 90% of a total surface area of the horizontal window.

18. The indicia reader of claim 13, wherein the $FOV_3$ proximal boundary and the $FOV_4$ proximal boundary respectively intersect a third frontal plane defined upwards from a proximal edge of the horizontal window such that the third image-data is receivable by the third imaging sensor from an indicium appearing in at least one of:
  (a) a first volume bounded by the $FOV_3$ first lateral boundary, the $FOV_3$ second lateral boundary, the $FOV_3$ proximal boundary, and the third frontal plane, or
  (b) a second volume bounded by the $FOV_4$ first lateral boundary, the $FOV_4$ second lateral boundary, the $FOV_4$ proximal boundary and the third frontal plane.

19. The indicia reader of claim 13, wherein the first imaging sensor is disposed in the lower housing portion, and the $FOV_1$ is folded towards the first imaging sensor via a first folding mirror disposed proximately to the first distal window.

20. The indicia reader of claim 13, wherein the second imaging sensor is disposed in the lower housing portion, and the $FOV_2$ is folded towards the second imaging sensor via a second folding mirror disposed proximately to the second distal window.

21. The indicia reader of claim 13, wherein the third imaging sensor is disposed in the lower housing portion, and the $FOV_3$ and the $FOV_4$ are folded and unified towards the third imaging sensor via a plurality of third mirrors.

22. The indicia reader of claim 13, wherein a perpendicular distance between the first frontal plane and a point on the $FOV_1$ central axis at a maximum extent of the $FOV_1$ working range is greater than 7 inches.

23. The indicia reader of claim 13, wherein a perpendicular distance between the first frontal plane and a point on the $FOV_2$ central axis at a maximum extent of the $FOV_2$ working range is greater than 7 inches.

24. An indicia reader, comprising:
a housing;
a lower housing portion of the housing having a first surface defining a first horizontal plane,
a horizontal window disposed in the first surface;
an upper housing portion extending beyond the first horizontal plane opposite to the lower housing portion, the upper housing portion bounded by a first frontal plane and a second horizontal plane, the first frontal plane being perpendicular to the first horizontal plane and defined by a forward extent of the upper housing portion, the second horizontal plane being parallel to the first horizontal plane and defined by an upward extent of the upper housing portion;
a first distal window disposed in a first distal corner of the upper housing portion, oriented obliquely to the first frontal plane;
a second distal window disposed in a second distal corner of the upper housing portion, opposite the first distal corner, oriented obliquely to the first frontal plane;
a first imaging assembly having a first imaging sensor, the first imaging assembly configured to capture first image-data from a first field of view ($FOV_1$) extending through the first distal window, the $FOV_1$ having an $FOV_1$ central axis, an $FOV_1$ working range defined along the $FOV_1$ central axis, an $FOV_1$ upper boundary, an $FOV_1$ lower boundary, an $FOV_1$ first lateral boundary, and an $FOV_1$ second lateral boundary, the $FOV_1$ lower boundary being closer to the first horizontal plane than the $FOV_1$ upper boundary;
a second imaging assembly having a second imaging sensor, the second imaging assembly configured to capture second image-data from a second field of view ($FOV_2$) extending through the second distal window, the $FOV_2$ having an $FOV_2$ central axis, an $FOV_2$ working range defined along the $FOV_2$ central axis, an $FOV_2$ upper boundary, an $FOV_2$ lower boundary, an $FOV_2$ first lateral boundary, and an $FOV_2$ second lateral boundary, the $FOV_2$ lower boundary being closer to the first horizontal plane than the $FOV_2$ upper boundary;
wherein the second horizontal plane intersects the first frontal plane at a first height relative to the first surface, the $FOV_1$ upper boundary intersects the first frontal plane at second height relative to the first surface, the $FOV_2$ upper boundary intersects the first frontal plane at third height relative to the first surface, and at least one of:
  the second height is greater than the first height, and the third height is greater than the first height;
a third imaging assembly having a third imaging sensor, the third imaging assembly configured to capture third image-data from a third field of view ($FOV_3$) and fourth field of view ($FOV_4$), both the $FOV_3$ and the $FOV_4$ extending though the horizontal window, the $FOV_3$ having an $FOV_3$ central axis, an $FOV_3$ proximal boundary, an $FOV_3$ distal boundary, and $FOV_3$ working range defined along the $FOV_3$ central axis, an $FOV_3$ first lateral boundary, and an $FOV_3$ second lateral boundary, and the $FOV_4$ having an $FOV_4$ central axis, an $FOV_4$ proximal boundary, an $FOV_4$ distal boundary, and an $FOV_4$ working range defined along the $FOV_4$ central axis, an $FOV_4$ first lateral boundary, and an $FOV_4$ second lateral boundary;

a scanning region defined by a union of the $FOV_1$, the $FOV_2$, the $FOV_3$, and the $FOV_4$;

wherein the $FOV_3$ distal boundary and the $FOV_4$ distal boundary respectively intersect the first frontal plane between the first horizontal plane and the second horizontal plane such that the third image-data is receivable by the third imaging sensor from an indicium appearing in at least one of:

a first volume bounded by the $FOV_3$ first lateral boundary, the $FOV_3$ second lateral boundary, the $FOV_3$ distal boundary and the first frontal plane; and a visual data analysis module configured to analyze at least one of:
  (a) the first image-data to decode data corresponding to an indicium appearing in the first image-data,
  (b) the second image-data to decode data corresponding to an indicium appearing in the second image-data, or
  (c) the third image-data to decode data corresponding to an indicium appearing in the third image-data.

* * * * *